United States Patent
Liu et al.

(10) Patent No.: US 10,260,906 B2
(45) Date of Patent: Apr. 16, 2019

(54) ABSOLUTE ROTARY ENCODER

(71) Applicant: Imperial Innovations Limited, London (GB)

(72) Inventors: Jindong Liu, Barnet (GB); Guang-Zhong Yang, Surrey (GB)

(73) Assignee: Imperial Innovations Limited, London (GB)

(*) Notice: Subject to any disclaimer, the term of this patent is extended or adjusted under 35 U.S.C. 154(b) by 0 days.

(21) Appl. No.: 15/531,285

(22) PCT Filed: Nov. 27, 2015

(86) PCT No.: PCT/GB2015/053621
§ 371 (c)(1),
(2) Date: May 26, 2017

(87) PCT Pub. No.: WO2016/083825
PCT Pub. Date: Jun. 2, 2016

(65) Prior Publication Data
US 2017/0343380 A1    Nov. 30, 2017

(30) Foreign Application Priority Data
Nov. 28, 2014 (GB) .................................. 1421196.5

(51) Int. Cl.
*G01D 5/14* (2006.01)
*G01B 7/00* (2006.01)
(Continued)

(52) U.S. Cl.
CPC ........... *G01D 5/145* (2013.01); *G01D 5/2452* (2013.01); *G01D 5/2497* (2013.01)

(58) Field of Classification Search
CPC .......... G01D 5/14; G01D 5/245; G01D 5/249; G01B 7/00; G01B 7/30; G01R 33/025; G01R 33/07; G01R 33/09
See application file for complete search history.

(56) References Cited

U.S. PATENT DOCUMENTS 6,145,214 A * 11/2000 Shimano ............... G01D 5/145
                                                  324/207.24
6,515,471 B1    2/2003 Santos
(Continued)

FOREIGN PATENT DOCUMENTS

EP    1830155    9/2007
EP    2450661    5/2012

OTHER PUBLICATIONS

GB Search Report for corresponding GB Patent Application 1421196.5 dated Apr. 17, 2015, 6 pages.
(Continued)

*Primary Examiner* — Neel D Shah
(74) *Attorney, Agent, or Firm* — Lee & Hayes, P.C.

(57) ABSTRACT

A rotary encoder for measuring absolute rotation around an axis of the rotary encoder, comprising: a magnetised element comprising first and second surfaces at an angle to one another; a first magnetic track provided on the first surface and a second magnetic track provided on the second surface, wherein the first and second magnetic tracks subtend an angle θ around the axis of the rotary encoder, wherein each magnetic track comprises a number of magnetic pole pairs, a magnetic pole pair being formed of two poles defining regions of opposite magnetic polarization, wherein the number of magnetic pole pairs in each track are different and have a greatest common factor of one; and first and second magnetic sensor arrangements, the first magnetic sensor arrangement arranged to detect a magnetic field of the first magnetic track and the second magnetic sensor arrangement arranged to detect a magnetic field of the second magnetic track, wherein the magnetic sensor arrangements are rotatably coupled to the magnetised element around the axis of the rotary encoder.

12 Claims, 3 Drawing Sheets

(51) Int. Cl.
*G01B 7/30* (2006.01)
*G01R 33/025* (2006.01)
*G01R 33/07* (2006.01)
*G01R 33/09* (2006.01)
*G01D 5/245* (2006.01)
*G01D 5/249* (2006.01)

(56) References Cited

U.S. PATENT DOCUMENTS

| | | |
|---|---|---|
| 7,317,313 B2 | 1/2008 | Carlson et al. |
| 7,999,536 B2 | 8/2011 | Santos et al. |
| 8,358,124 B2 | 1/2013 | Katou et al. |
| 8,760,153 B2 | 6/2014 | Parakka |
| 8,847,585 B2 * | 9/2014 | Koto .................. G01D 5/2452 324/207.2 |
| 2007/0132447 A1 | 6/2007 | Reimer et al. |
| 2009/0102461 A1 | 4/2009 | Santos et al. |
| 2010/0176799 A1 | 7/2010 | Ausserlechner |
| 2014/0028294 A1 | 1/2014 | Granig et al. |

OTHER PUBLICATIONS

PCT Search Report for corresponding PCT International Patent Application No. PCT/GB2015/053621 dated Feb. 4, 2016, 3 pages.

* cited by examiner

ABSOLUTE ROTARY ENCODER

This Application is a U.S. National stage of PCT/GB2015/053621 filed Nov. 27 2015, and claims priority to 1421196.5 (GB) filed Nov. 28, 2014, which are incorporated herein by reference.

FIELD OF THE INVENTION

The present invention relates to the field of rotary encoders. In particular, the present invention relates to absolute rotary encoders.

BACKGROUND TO THE INVENTION

A rotary encoder is a device which measures the angular position of a shaft around a rotational axis of the encoder. There are two types of rotary encoders: incremental, which determine the relative change in position, or motion, of the shaft; and absolute, which determine the absolute position of the shaft around the rotational axis of the encoder. Absolute rotary encoders are widely used in a range of applications and technical fields such as robotics, medical devices, telescopes and CNC machines.

There are many types of absolute rotary encoder devices (e.g. magnetic, capacitive, mechanical, and optical). For applications requiring a relatively high resolution encoder, optical and magnetic rotary encoders are the most widely used devices. Optical rotary encoders are generally high resolution and high accuracy devices, but tend to be expensive. In addition to their cost, optical encoders are not suited to many applications because of their lack of robustness; they must be precisely aligned and are particularly sensitive to contaminants such as dirt or moisture, which can cause optical errors and lead to incorrect position readings. Magnetic encoders have a lower resolution and accuracy than optical encoders, but are cheaper and more robust. Because the absolute angular position is calculated using magnetic signals rather than optical ones, magnetic encoders are not affected by the presence of contaminating moisture or particulates in the way that optical encoders are. Magnetic encoders are therefore much better suited to harsh industrial environments.

There are two main types of magnetic rotary encoder: on-axis and off-axis, with some devices are a combination of the two. On-axis magnetic rotary encoders comprise a single magnet, polarised transverse to the rotational axis of the rotary encoder, and a magnetic sensor arrangement arranged on the rotational axis of the encoder. An example of such an approach is described in U.S. Pat. No. 7,317,313 B2. However, such devices have a relatively low resolution and the layout of the components precludes the possibility of the encoder having a hollow shaft suitable for passing wiring through. Higher resolution rotary encoders use two magnetic fields, such as the rotary encoder of U.S. Pat. No. 8,760,153 B2, which incorporates an off-axis magnetised element in addition to the on-axis magnet. The magnetised element of that invention is a ring arranged coaxially with the rotational axis of the encoder. A circular magnetic track comprising a number of magnetic pole pairs is arranged coaxially with the rotational axis on a surface of the magnetised element.

Although addressing the problem of low resolution, wiring still cannot be passed through the shaft of the encoder due to the presence of the on-axis magnet. Entirely off-axis magnetic rotary encoders overcome this problem by allowing for a hole in the centre of the magnetised element. However, in the absence of an on-axis magnet, multiple off-axis magnetic tracks are needed in order to achieve a high resolution. Off-axis magnetic rotary encoders therefore comprise a magnetised element with multiple magnetic tracks, each magnetic track comprising a number of magnetic pole pairs. The multiple magnetic tracks are arranged either on those surfaces of the magnetised element parallel to the rotational axis of the encoder, as with the encoder of U.S. Pat. No. 8,358,124 B2, or on those surfaces of the magnetised element perpendicular to the rotational axis, as with the encoder of U.S. Pat. No. 7,999,536 B2.

High resolution off-axis encoders allow for the possibility of a hollow shaft through which wiring can be passed. However, a gap must be maintained between each of the multiple magnetic tracks in order to prevent interference between the magnetic fields of the individual magnetic tracks. Consequently, the use of multiple magnetic tracks increases the thickness or width of the magnetised element of the encoder, and thus increases the overall size of the encoder. There is clearly a need for a reliable magnetic rotary encoder with a sufficiently high resolution and a compact structure.

SUMMARY OF THE INVENTION

According to a first aspect of the present invention, there is provided a rotary encoder for measuring absolute rotation around an axis of the rotary encoder, comprising:

a magnetised element comprising first and second surfaces at an angle to one another;

a first magnetic track provided on the first surface and a second magnetic track provided on the second surface, wherein the first and second magnetic tracks subtend an angle $\theta$ around the axis of the rotary encoder, wherein each magnetic track comprises a number of magnetic pole pairs, a magnetic pole pair being formed of two regions of opposite magnetic polarization, wherein the number of magnetic pole pairs in each track are different and have a greatest common factor of one; and first and second magnetic sensor arrangements, the first magnetic sensor arrangement arranged to detect a magnetic field of the first magnetic track and the second magnetic sensor arrangement arranged to detect a magnetic field of the second magnetic track, wherein the magnetic sensor arrangements are rotatably coupled to the magnetised element around the axis of the rotary encoder.

The rotary encoder of the present invention can determine an absolute position around the rotational axis of the encoder. If the magnetised element were to rotate around the rotational axis of the encoder, the magnetic field detected by each magnetic sensor arrangement would fluctuate due to the presence of multiple magnetic pole pairs in each magnetic track and the ensuing variations in magnetic polarization. As the number of pole pairs within each track within the subtended angle $\theta$ around the axis of the rotary encoder, i.e. the number of magnetic pole pairs, in each track are different and have a greatest common factor of one, combining the measurements from the two magnetic sensor arrangements can give a unique value, which is corresponded to an absolute position of the rotary encoder. The present invention has an efficient architecture; the arrangement of the two magnetic tracks on different surfaces of the magnetised element means a magnetic rotary encoder can be manufactured which is smaller than those currently available, but with the same resolution. The present invention could also be manufactured with a hollow shaft through which wires could be passed, without the device being any larger than those currently available. This could be advantageous for applications in which multiple rotary encoders are joined in series.

Preferably, the first and second surfaces of the magnetised element are perpendicular to one another. Furthermore, in preferred embodiments the magnetic sensor arrangements are orientated perpendicular to one another. This architecture ensures the overall size of the encoder is minimised.

In preferred embodiments, each magnetic track forms a circular arc. The arc may be complete or incomplete, depending on the range of measurement required. In preferred embodiments, the arc is complete, allowing measurement around a full circle. For example, the magnetised element may preferably be a circular ring arranged coaxially around the axis of the rotary encoder. Furthermore, in preferred embodiments the angle θ is equal to 360 degrees. The geometry of these preferred embodiments allows the encoder to measure the absolute position through the full 360 degree range, whilst still allowing for a small device with the option for a hole in the magnetised element through which wiring can be passed. In preferred embodiments, each sensor arrangement comprises a plurality of sensors. Preferably, the sensors in the first sensor arrangement are separated by an angular distance ϕ around the axis of the rotary encoder which is the same as an angular width of the poles within the first magnetic track. Similarly, the sensors in the second sensor arrangement may preferably be separated by an angular distance ϕ' around the axis of the rotary encoder which is the same as an angular width of the poles within the second magnetic track. In this manner each sensor can be suitably located with respect to the magnetic pole pairs of the corresponding magnetic track.

In a preferred embodiment, the ratio of the distance r of the sensors of the first magnetic sensor arrangement from the axis of the rotary encoder to the number of magnetic pole pairs N in the first magnetic track is equal to the ratio of the distance r' of the sensors of the second magnetic sensor arrangement from the axis of the rotary encoder to the number of magnetic poles M in the second magnetic track. In this manner, sensor arrangements of the same design (particularly the same separation between sensors) can be used for both sensor arrangements and suitably located with respect to the first and second magnetic tracks.

Preferably, the sensors are hall sensors. These sensors provide reliable measurements that can be readily integrated with other electronics.

BRIEF DESCRIPTION OF THE DRAWINGS

Preferred embodiment of the present invention will now be described with reference to the accompanying drawings, in which.

DETAILED DESCRIPTION

Figure 1:
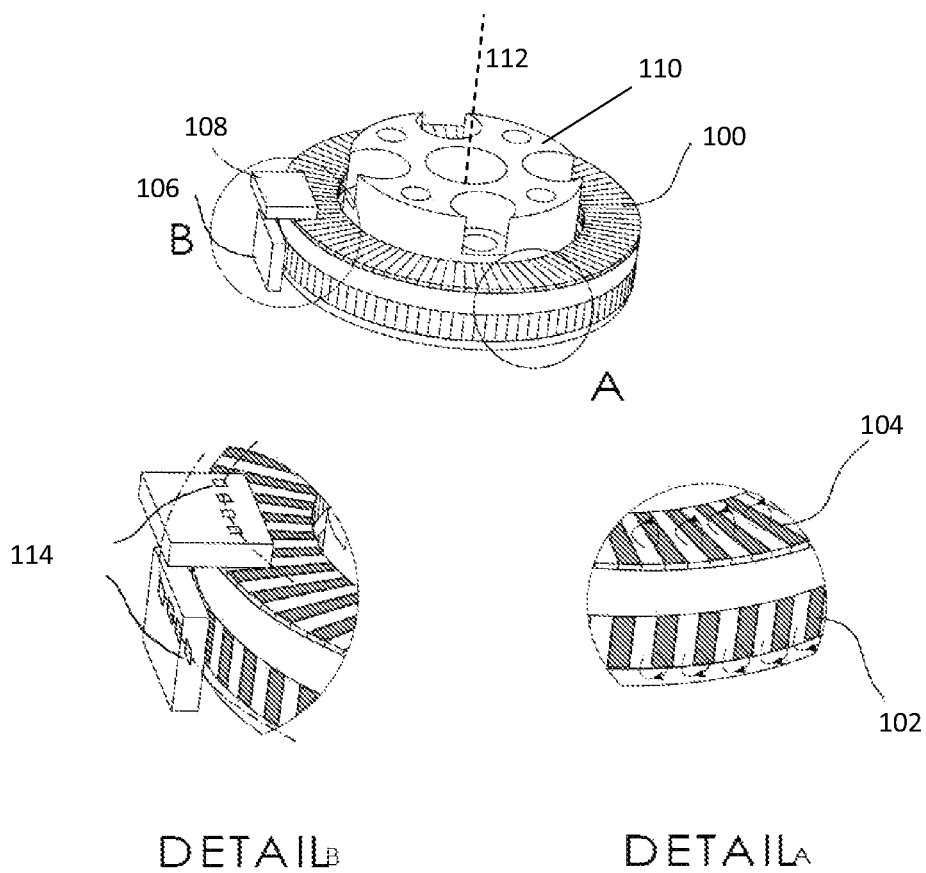
FIG. 1 illustrates the arrangement of the magnetised element and magnetic sensor arrangements.

Referring to FIG. 1, there is shown an absolute rotary encoder according to a preferred embodiment of the present invention. Absolute position of the rotary encoder is measured around the rotational axis of the encoder 112. The absolute rotary encoder of this embodiment comprises: a magnetised element 100; first and second magnetic tracks 102 and 104; and first and second magnetic sensor arrangements 106 and 108. In this embodiment, the absolute rotary encoder also comprises a hollow shaft 110 which is arranged coaxially with the rotational axis of the encoder 112.

The magnetised element 100 in this embodiment is a circular magnetised ring 100, although alternative geometries may be used. The magnetised ring 100 is arranged coaxially around the rotational axis 112 and hollow shaft 110, such that the hollow shaft 110 protrudes through the hole at the centre of the magnetised ring 100. The magnetised ring 100 is imprinted with a first magnetic track 102 and a second magnetic track 104. In this embodiment, the two magnetic tracks 102 and 104 are circular magnetic tracks, although alternative geometries may be used. Each magnetic track 102 and 104 is imprinted on a different, mutually perpendicular, surface of the magnetised ring 100, such that both magnetic tracks 102 and 104 are arranged coaxially with the rotational axis 112 and subtend an angle of 360 degrees around rotational axis 112. The first magnetic track 102 is imprinted on a surface of the magnetised ring 100 which has a surface normal vector orientated perpendicular to the rotational axis 112 of the encoder. The second magnetic track 104 is imprinted on a surface of the magnetised ring 100 which has a surface normal vector orientated parallel to the rotational axis 112 of the encoder.

Each imprinted magnetic track 102 and 104 comprises a number of magnetic polar pairs, a magnetic pole pair being formed of two regions of opposite magnetic polarization. Each magnetic pole in first magnetic track 102 has a pole length (width of the magnetic pole) of D, corresponding to an angular width around the axis of the rotary encoder of ϕ. Therefore, each magnetic pole pair has a pole pair length of 2D. The first magnetic track 102 comprises N magnetic pole pairs and the second magnetic track 104 comprises M magnetic pole pairs; N is greater than M, and N and M have a greatest common factor of 1. In the preferred embodiment, N=50 and M=47.

The pole length of each magnetic pole in track 104 varies with the distance of a given point from the axis of rotation. However, the angular width of each pole is constant at ϕ'.

The first magnetic sensor arrangement 106 and second magnetic sensor arrangement 108 are arranged to detect the magnetic fields of the first and second magnetic tracks 102 and 104 respectively. The magnetic sensor arrangements 106 and 108 are rotatably coupled to the magnetised element 100 around the rotational axis 112 of the encoder. As such, they may rotate around this axis. In the preferred embodiment, magnetic sensor arrangements 106 and 108 each comprise four equally spaced hall sensors 114. The distance d between the hall sensors 114 in magnetic sensor arrangements 106 and 108 corresponds to the angular width of the poles within the magnetic track detected by that arrangement. As such, the angular distance around the rotational axis of the encoder separating the hall sensors 114 with the first sensor arrangement is ϕ and in the second sensor arrangement is ϕ'.

In this embodiment, the distance d between hall sensors 114 in both sensor arrangements is the same. This simplifies manufacturing. Furthermore the distance d may additionally be substantially equal to the distance D representing the width of the pole pairs in the first magnetic track 102. The first magnetic sensor arrangement 106 is arranged to detect the magnetic field of the first magnetic track 102 and is disposed such that the four hall sensors 114 are located on a circle concentric to first magnetic track 102, the circle having a circumference of 2*N*D. Similarly, the second magnetic sensor arrangement 108 is arranged to detect the magnetic field of the second magnetic track 104 and is disposed perpendicular to first magnetic sensor arrangement 106, such that the four hall sensors 114 in the second magnetic sensor arrangement 108 are located on a circle concentric to magnetic track 104, the circle having a circumference of 2*M*D. As such, the ratio of the distance r of the first magnetic sensor arrangement 106 from the axis of the rotary encoder to the number of magnetic pole pairs N in the first magnetic track 102 is equal to the ratio of the distance r' of the second magnetic sensor arrangement 108 to the number of magnetic poles M in the second magnetic track 104 (r:N is equal to r':M). The relationship may hold for embodiments in which the magnetic tracks 102 and 104 do not form a full circle.

The absolute rotary encoder shown in FIG. 1 measures the absolute position around the rotational axis 112. The magnetised element 100 rotates around the rotational axis 110 with respect to the magnetic sensor arrangements 106 and 108. As the magnetised element 100 rotates, the magnetic sensor arrangements 106 and 108 detect a change in the magnetic fields from magnetic tracks 102 and 104 respectively. Within each magnetic pole pair, the magnetic field detected by the respective magnetic sensor arrangement will change depending on the location of the four hall sensors 114 with respect to the magnetic pole pair.

As the magnetised element 100 rotates, the output from each magnetic sensor arrangement varies from zero to a maximum reading of h_max. The output then drops to zero when the next magnetic pole pair is reached and the pattern is repeated, with the output increasing to h_max as the magnetised element 100 continues to rotate around the rotational axis 112.

Figure 2:
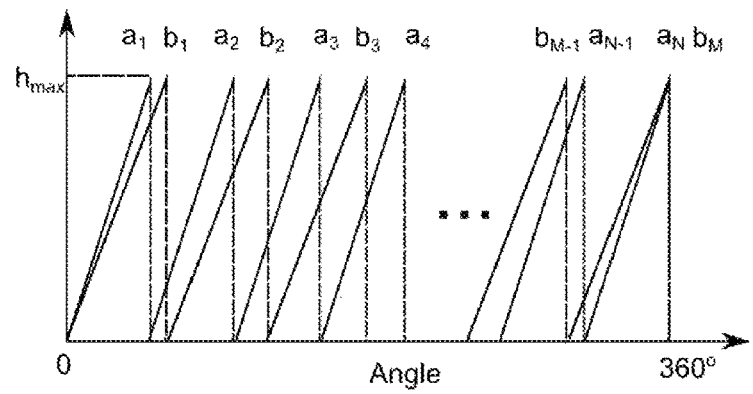
FIG. 2 shows exemplary output readings of the two magnetic sensor arrangements.

In this embodiment, the sensor output for magnetic sensor arrangement 106 will have N repeated patterns (a1, a2 to aN) and the sensor output for magnetic sensor arrangement 108 will have M repeated patterns (b1, b2 to bM). An example output from the two magnetic sensor arrangements 106 and 108 is shown in FIG. 2. Due to the presence of two magnetic tracks 102 and 104, with differing numbers of magnetic pole pairs, the absolute angle of the encoder around the rotational axis 112 can be determined; each angular position is correlated to a unique combination of magnetic sensor arrangement outputs.

The magnetic tracks 102 and 104 may be consecutively imprinted on the magnetised element 100. Preferably, the centre of the two circular magnetic tracks 102 and 104 should be closely aligned with the centre of the magnetised ring 100. However, in practice there may be a slight variation arising during manufacture, causing the two magnetic tracks 102 and 104 to not be quite exactly concentric and aligned with the magnetised ring 100. Such imperfections in the positioning of the magnetic tracks 102 and 104 affect the output of the magnetic sensor arrangements 106 and 108. The absolute rotary encoder of the preferred embodiment may therefore be calibrated as follows.

The signal difference S_diff between the output of magnetic sensor arrangements 106 and 108 is a step function with multiple cycles. Assuming that p_1 is the sensor output for magnetic sensor arrangement 106 and p_2 is the sensor output for magnetic sensor arrangement 108, the signal difference S_diff is calculated as follows:

$$S\_diff = p\_1 - (N/M)*p\_2, \text{ if } p\_1 - (N/M)*p\_2 > b\_threshold$$

$$S\_diff = p\_1 - (N/M)*p\_2 + h\_max*(N/M), \text{ otherwise}$$

where b_threshold is a number close to 0 and h_max is the maximum sensor reading.

Figure 3:
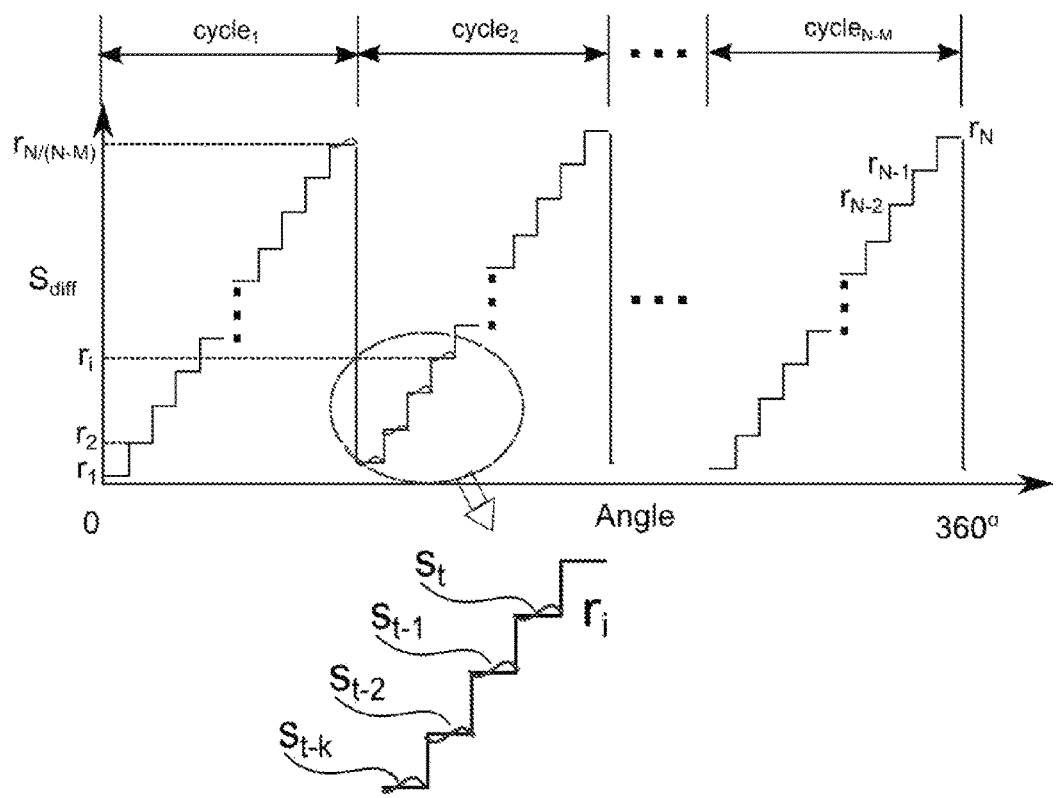
FIG. 3 illustrates the method of calculation of the absolute position of the rotary encoder around the rotational axis of the encoder.

There are N steps in each cycle and N-M cycles. These multiple cycles of step function are shown in FIG. 3. If the magnetised element 100 and magnetic tracks 102 and 104 were precisely and accurately aligned during manufacture, the signal difference S_diff in each cycle would be identical. However, variations in concentricity of the two magnetic tracks 102 and 104 mean the signal output at each step is slightly different between cycles. For each step 1 to N, the mean signal difference over the N-M cycles is found; this process gives a reference line r_i for the signal difference at each step (for i=1 to N, r_1, r_2 to r_N). In order to determine which position a given signal difference step S_t equates to, the error between the signal difference S_t and reference lines r_i (for i=1 to N) can be found; the r_i for which the error is minimised is the most likely reference line for S_t.

Figure 4:
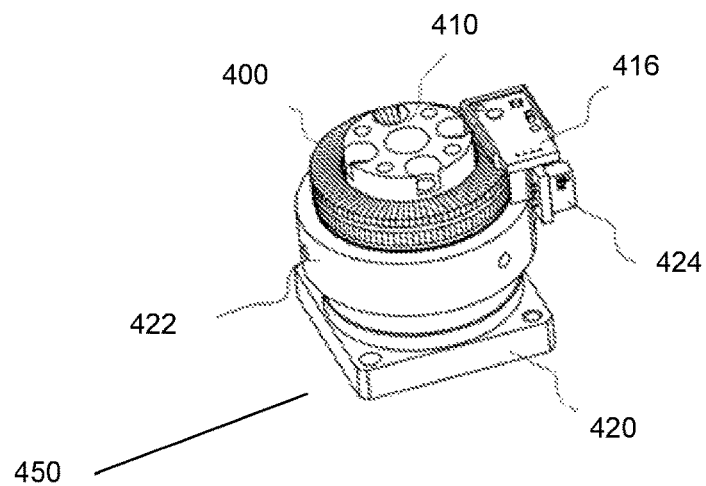
FIG. 4 illustrates the use of the preferred embodiment of the absolute rotary encoder in a joint for robotic purposes.

FIG. 4 shows a use of the preferred embodiment of the present invention in a joint 450 for robotic purposes. A motorised gearbox is coupled to the magnetised element 400 and the hollow shaft 410. The magnetic sensor arrangements are rotatably coupled to the magnetised element 400. The magnetic sensor arrangements 406 and 408 can be arranged on printed circuit boards 416 and the hall sensors 114 connected to other electronics. The rotary encoder can be placed in a housing 422 and controlled through an interface 424.

The rotary encoder of the present invention has many advantages over previous rotary encoder designs. Due to the offsetting of the magnetic tracks 102 and 104 on different surfaces of the magnetised element 100, the magnetised ring 100 of the preferred embodiment can be smaller in diameter than conventional magnetic rotary encoders of the same resolution. Alternatively, the magnetised element 100 can have a hole in the centre through which wiring can pass, without the size of the rotary encoder increasing to accommodate the hole. A smaller rotary encoder means that the device weighs less for the same functionality, thus reducing material and transport costs.

Figure 5:
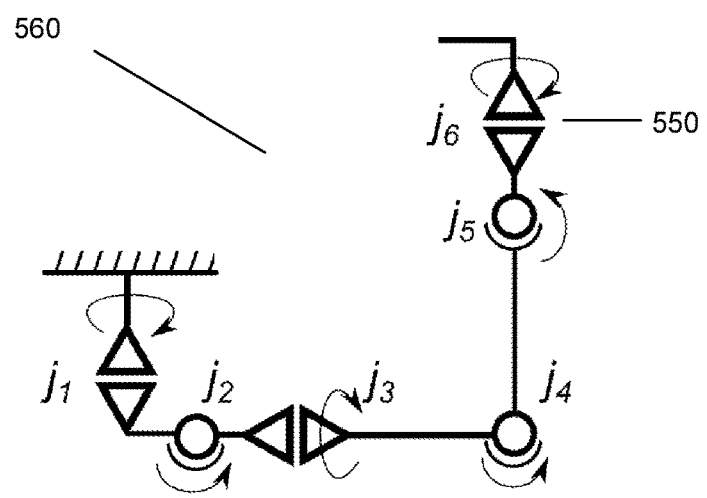
FIG. 5 shows a schematic plan of a kinetic chain of robotic joints using the preferred embodiment of the absolute rotary encoder.

One or more of the rotary encoder of the present invention can be used in series to form a robotic arm 560, as shown in FIG. 5. FIG. 5 schematically illustrates the locations and orientations of different joints 550 in a robotic arm, where the joints are the joint 450 of FIG. 4.

A robotic device for medical use is an exemplary use of the robotic arm 560 shown in FIG. 5. The robotic device can comprise a robotic arm and surgical devices could be coupled to one end of the robotic arm. An attachment device could be coupled to another end of the robotic arm to allow the robotic device to be mounted for use in surgical procedures.

In surgical procedures, surgical instruments must be accurately positioned and often maintained in a steady position for prolonged periods of time. In traditional surgical procedures, a nurse may hold an instrument steady under the supervision of the surgeon. However, such a process is inefficient and can lead to inaccuracies in positioning of surgical instruments. One solution is to use mechanical supporting arms with multiple joints, the joints being actuated by manual, electromagnetic, pneumatic or hydraulic controls. However, mechanical supporting arms cannot feedback the exact position of the instruments. Furthermore, the mechanical supporting arms cannot hold many instruments due to payload limitations. In order to have accurate positioning information or a higher payload, heavier robotic arms such as Da Vinci Surgical robotic arm are required. However, such devices are expensive, are not portable and require training before use.

In a robotic device as described above, the rotary encoder of the present invention can determine the absolute angular measurement at each joint. Combining the angle measurement of each joint with the predefined length of each arm section, the position and orientation of the medical instrument can be calculated. A surgeon can then predefine a constrained workspace for the instrument so that the arm will lock if the instrument is beyond the boundary of the constrained workspace.

Although in the preferred embodiment described above, the magnetic tracks 102 and 104 form complete circles allowing measurement around 360 degrees, alternative embodiments may be designed to measure within a particular range. As such, it is not necessary that the magnetic tracks 102 and 104 extend through a complete circle. In some embodiments, for example, each magnetic track may form a section of a circular arc. However, as the number of magnetic pole pairs in each track within a subtended angle θ around the axis of the rotary encoder are different and have a greatest common factor of one, it remains possible to uniquely identify each position within the relevant range.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination. It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present disclosure.

What is claimed is:

1. A rotary encoder for measuring absolute rotation around an axis of the rotary encoder, comprising:
a magnetised element comprising first and second surfaces at an angle to one another;
a first magnetic track provided on the first surface and a second magnetic track provided on the second surface, wherein the first and second magnetic tracks subtend an angle Θ around the axis of the rotary encoder, wherein each magnetic track comprises a number of magnetic pole pairs, a magnetic pole pair being formed of two poles defining regions of opposite magnetic polarization, wherein the number of magnetic pole pairs in each track are different and have a greatest common factor of one; and
first and second magnetic sensor arrangements, the first magnetic sensor arrangement arranged to detect a magnetic field of the first magnetic track and the second magnetic sensor arrangement arranged to detect a magnetic field of the second magnetic track, wherein the magnetic sensor arrangements are rotatably coupled to the magnetised element around the axis of the rotary encoder.

2. The rotary encoder of claim 1, wherein the first and second surfaces of the magnetised element are perpendicular to one another.

3. The rotary encoder of claim 1, wherein the magnetic sensor arrangements are orientated perpendicular to one another.

4. The rotary encoder of claim 1, wherein each magnetic track forms a circular arc.

5. The rotary encoder of claim 1, wherein the magnetised element is a circular ring arranged coaxially around the axis of the rotary encoder.

6. The rotary encoder of claim 1, wherein the angle Θ is equal to 360 degrees.

7. The rotary encoder of claim 1, wherein each sensor arrangement comprises a plurality of sensors.

8. The rotary encoder of claim 1, wherein the sensors in the first sensor arrangement are separated by an angular distance φ around the axis of the rotary encoder which is the same as an angular width of the poles within the first magnetic track.

9. The rotary encoder of claim 1, wherein the sensors in the second sensor arrangement are separated by an angular distance φ' around the axis of the rotary encoder which is the same as an angular width of the poles within the second magnetic track.

10. The rotary encoder of claim 1, wherein the ratio of the distance r of the sensors of the first magnetic sensor arrangement from the axis of the rotary encoder to the number of magnetic pole pairs N in the first magnetic track is equal to the ratio of the distance r' of the sensors of the second magnetic sensor arrangement from the axis of the rotary encoder to the number of magnetic poles M in the second magnetic track.

11. The rotary encoder of claim 1, wherein the sensors are hall sensors.

12. A surgical instrument comprising at least one rotary encoder according to claim 1.

* * * * *